Jan. 7, 1969 E. O. P. TATTER ET AL 3,420,460

SELF-THREADING TAPE RECORDER

Filed Oct. 26, 1964 Sheet 1 of 5

Inventors:
Ernest O.P. Tatter
Philip Vazzano
By Hofgren, Wegner,
Allen, Stellman & McCord Att'ys Jan. 7, 1969 E. O. P. TATTER ETAL 3,420,460

SELF-THREADING TAPE RECORDER

Filed Oct. 26, 1964

United States Patent Office 3,420,460

Patented Jan. 7, 1969

3,420,460

SELF-THREADING TAPE RECORDER

Ernest O. P. Tatter, Addison, and Philip Vazzano, Des Plaines, Ill., assignors to Warwick Electronics Inc., a corporation of Delaware Filed Oct. 26, 1964, Ser. No. 406,239

U.S. Cl. 242—55.12 2 Claims

Int. Cl. G11b *15/44*

ABSTRACT OF THE DISCLOSURE

A tape recorder wherein a web of material of uniform width is frictionally fed along a path from a supply reel to a capstan feeding means by an initial drive means which bears directly upon the material between the edges thereof. The capstan drive feeds the material to a take-up reel that includes means for automatically frictionally gripping the end of the material; and means, responsive to winding of the material on the take-up reel, is provided for moving the initial drive means out of the material path, for moving a member for guiding the end of material into the take-up reel to an inactive position, for shifting a backing member into engagement with a magnetic head assembly, and for shifting an end sensing member into engagement with the material.

This invention relates in general to tape recorders, and more particularly to self-threading tape recorders which automatically thread tape from a supply reel to a take-up reel.

In the tape recorder industry there has been a long felt need for a simplified apparatus which would satisfactorily perform all of the functions of prior art devices while being easy to operate so as to appeal to a wide consumer market. One of the most troublesome problems which has been encountered in the use of known devices has been the necessity of manually threading the leading end of the tape from the supply reel past the magnetic head assembly to the take-up reel where the end of the tape is affixed to the take-up reel. Accordingly, the general purpose of the present invention is to provide a tape recorder wherein the tape is automatically fed from the supply reel past the magnetic head assembly and onto the take-up reel.

An object of the invention is to provide a tape recorder with a take-up reel which automatically grips the leading end of the tape, and with a guide means which guides the tape in its travel from the supply reel past the magnetic head assembly onto the gripping means of the take-up reel.

Another object of the invention is to provide a tape recorder as defined in the preceding paragraph with means for feeding the tape from the supply reel past the magnetic head assembly to a drive capstan which then feeds the tape to the gripping means of the take-up reel.

A further object of the invention is to retain the backing member for the magnetic head assembly of a tape recorder out of engagement with the magnetic head assembly until the tape is firmly wound upon the take-up reel.

Still another object of the invention is to provide a tape recorder, as described above, with means for interrupting the initial means for feeding the tape from the supply reel to the drive capstan in response to the tape being firmly gripped by the take-up reel.

A still further object of the invention is to provide novel means for guiding the leading end of the tape onto the gripping means of the take-up reel.

Yet another object of the invention is to provide novel means for sensing the gripping of the tape by the take-up reel.

Still another object of the invention is to provide a novel guide means for a tape recorder, as described above, with means for allowing the supply reel and the take-up reel to be removed from the tape recorder after part of the tape has been wound upon the take-up reel.

These and other objects of the invention will hereinafter become more fully apparent from the following description taken in connection with the annexed drawings, wherein.

Figure 1:
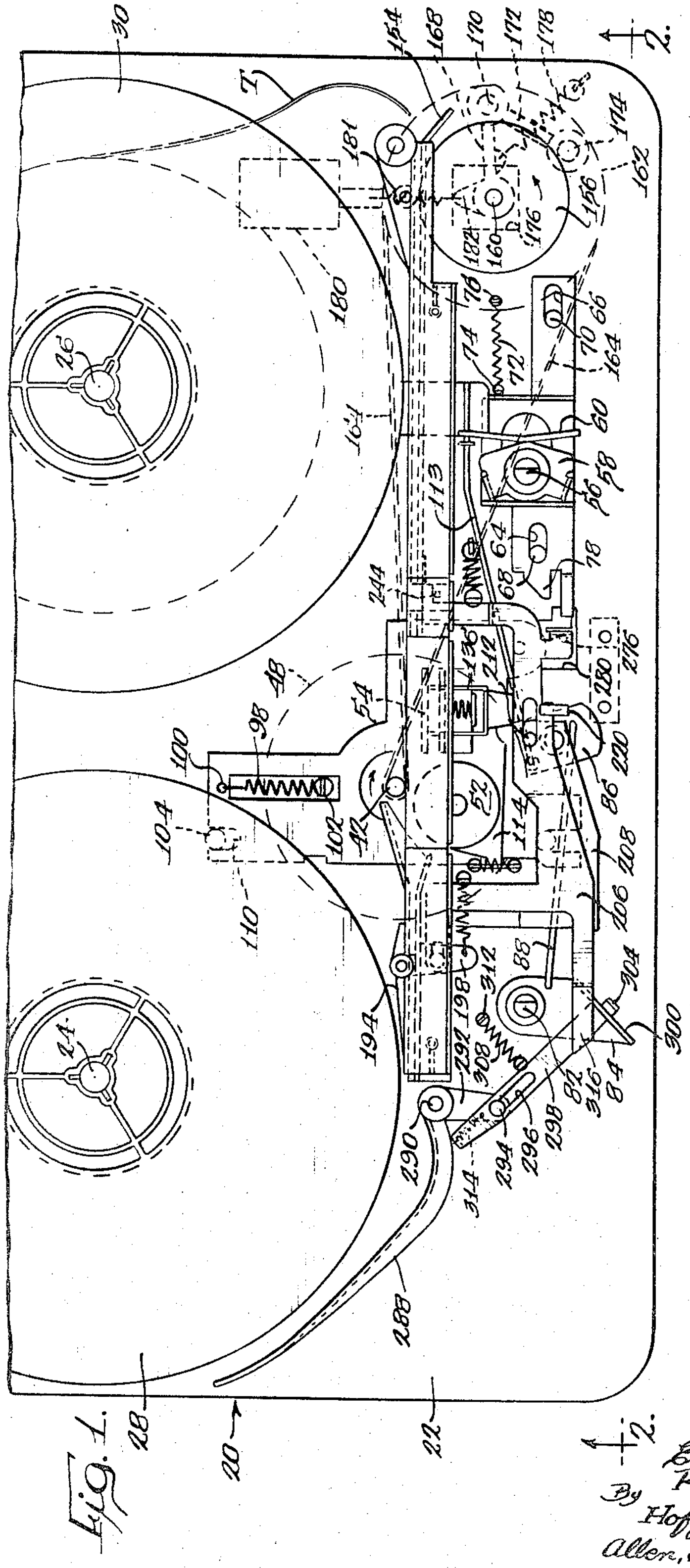
FIG. 1 is a fragmentary plan view of a tape recorder illustrating a preferred embodiment of the present invention before the tape has been fed from the supply reel to the take-up reel.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated. The scope of the invention will be pointed out in the appended claims.

Referring now to the drawings, wherein like reference characters designate like or corresponding parts throughout the several views, a tape recorder, indicated generally at 20, has a base plate 22 from which a motor, not shown, is suspended. Spindles 24 and 26 are rotatably mounted on base plate 22, and are adapted to rotate a take-up reel 28 and a supply reel 30, respectively. The means for rotating spindles 24 and 26 are conventional, and are shown for example in the U.S. patent to Klein No. 2,868,471. A suitable brake member 32 (FIG. 3) is provided for spindles 24 and 26, and is actuated by a bell crank 34 which is pivoted to the base 22 at 36. A spring 37 is connected between the bell crank 34 and the base 22 to urge the brake member 32 toward a braking position. The operation of the brake mechanism is conventional, and is also described in detail in the above mentioned Klein patent. Conventional controls, not shown, for turning the unit on and for selecting record or playback are provided on the unit, as is well known in the art.

Figure 2:
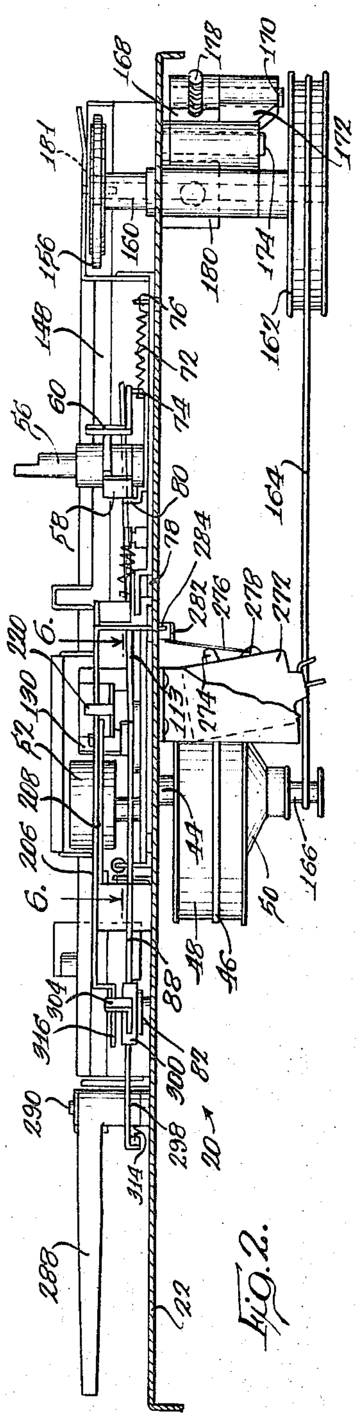
FIG. 2 is a sectional view, taken generally along line 2—2 of FIG. 1, with certain parts broken away for clarity of illustration.

A magnetic head assembly 38 is fixed on base 22, as by a suitable bracket 40, and is positioned forwardly of and generally between reels 28 and 30. A capstan 42 is provided adjacent the magnetic head assembly 38 for driving the tape T from the supply reel to the take-up reel. The capstan 42 is defined by the upper end of a shaft 44 (FIG. 2), and shaft 44 is rotated by a belt 46 that embraces a pulley 48 formed on a capstan flywheel 50. A rotatable pressure roller 52, formed of resilient material, is movable into and out of engagement with capstan 42 to retain the tape against the capstan during the driving of the same. A suitable backing member 54 is provided adjacent pressure roller 52, and is movable toward and away from the magnetic head assembly 38 to press the tape against the magnetic heads during record and playback cycles.

The tape recorder 20 includes means for providing a fast wind and a fast rewind of the tape. This means includes a control shaft 56 pivotally mounted on the base 22 and having a cam plate 58 movable therewith. The forwardly extending arm of bell crank 34 includes an upwardly extending flange 60 which is positioned in general horizontal alignment with cam 58. Thus, as shaft 56 is rotated in either a clockwise or a counterclockwise direction, the cam 58 will engage the flange 60 to pivot the bell crank 34 about pivot 36 and move the brake 32 out of braking engagement with the spindles 24 and 26.

Means are provided to prevent the initiation of a fast wind or a fast rewind cycle when a record or playback cycle has been selected, and includes a longitudinally movable detent lever 62 having longitudinal slots 64 and 66 therein which cooperate with pins 68 and 70, respectively, on the base 22 to guide the lever 62 in its longitudinal movement. Lever 62 is urged to the right, as viewed in FIGS. 1 and 3, by a spring 72 which is connected between a tab 74 on the lever 62 and a tab 76 on the base 22. An upwardly extending flange 80 is provided on member 62, and is engaged by the cam 58 when the shaft 56 is pivoted in a clockwise or counterclockwise direction to move lever 62 to the left against the bias of spring 72 into a detenting position. A detent in the form of an extension 78 is provided on the left hand end of member 62 to prevent the initiation of a record or playback cycle, when a fast rewind or fast wind cycle has been selected, as will hereinafter be more fully explained in detail.

The means for initiating the feeding of the tape includes a shaft 82 which is pivotally mounted on base 22. An arm 84 is fixed to shaft 82 and is movable therewitn. Shaft 82 is connected to a member 86, which is rotatably mounted on base 22 at 90, by a link 88 which extends therebetween. A pin 92 is provided on the undersurface of member 86, and is engageable with a camming surface on a secondary slide 96, including a notch 94, to shift the secondary slide 96 rearwardly of the tape recorder when member 86 is pivoted in a clockwise direction by clockwise pivoting of shaft 82. The secondary slide 96 is biased forwardly of the tape recorder by a spring 98 which is connected between a tab 100 on the slide 96 and a tab 102 on the base 22. The slide 96 is guided in its longitudinal movement by pins 104 and 106 on the base 22 which cooperate with respective slots 110 and 112 in the slide 96. A link 113 is connected to member 86, and the right hand end thereof is slidable in the flange 60 on the forwardly extending arm of the brake actuator bell crank 34. An abutment 115 is provided on link 113 adjacent flange 60, so that when shaft 82 is rotated in the clockwise direction, the abutment 115 moves into engagement with the flange 60 to pivot the bell crank, and free the brake 32.

Figure 3:
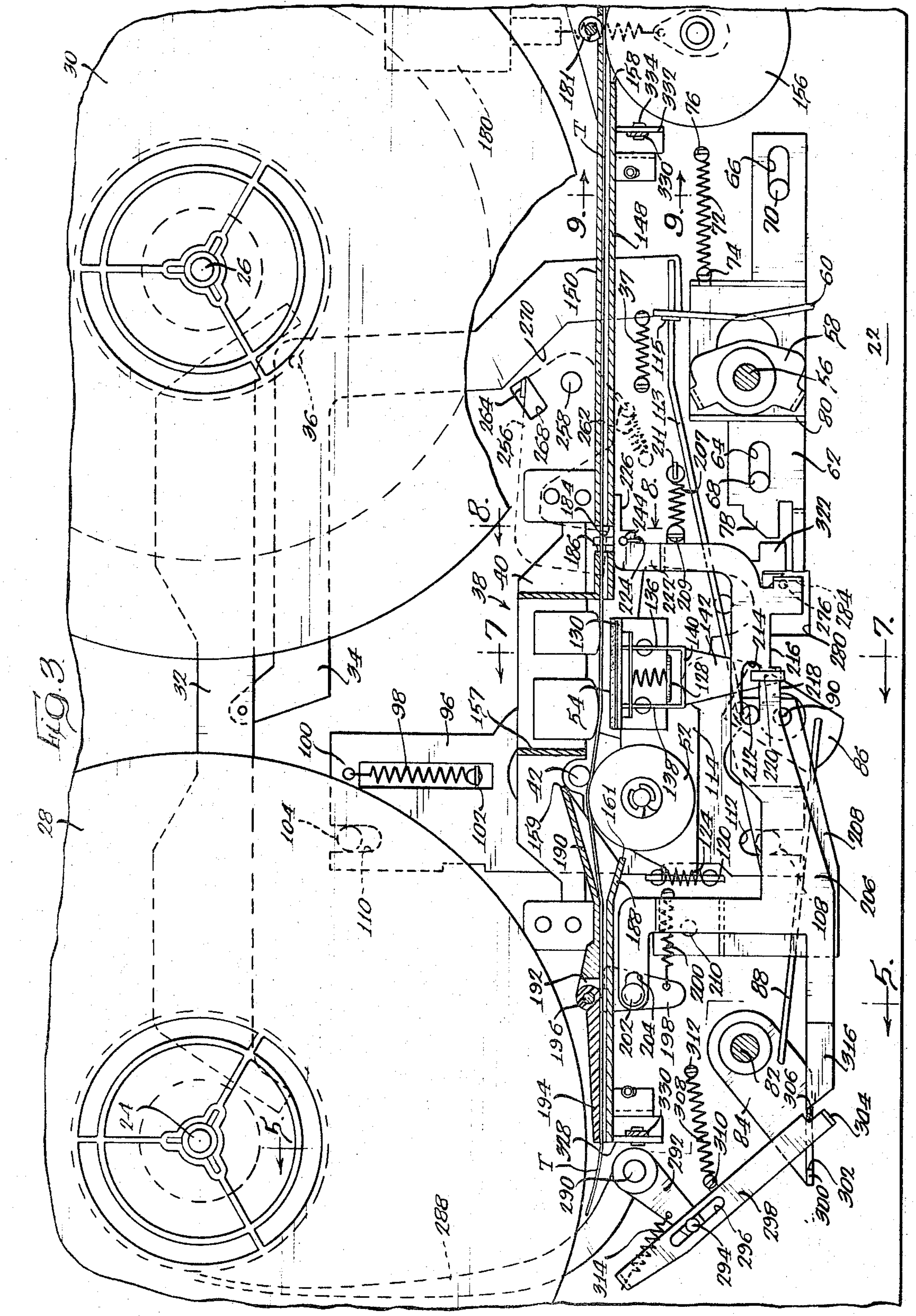
FIG. 3 is an enlarged fragmentary plan view, similar to FIG. 1, illustrating the self-threading structure in detail, with certain parts being shown in section and others broken away for clarity, and showing the prior to being gripped by the take-up reel.
Figure 4:
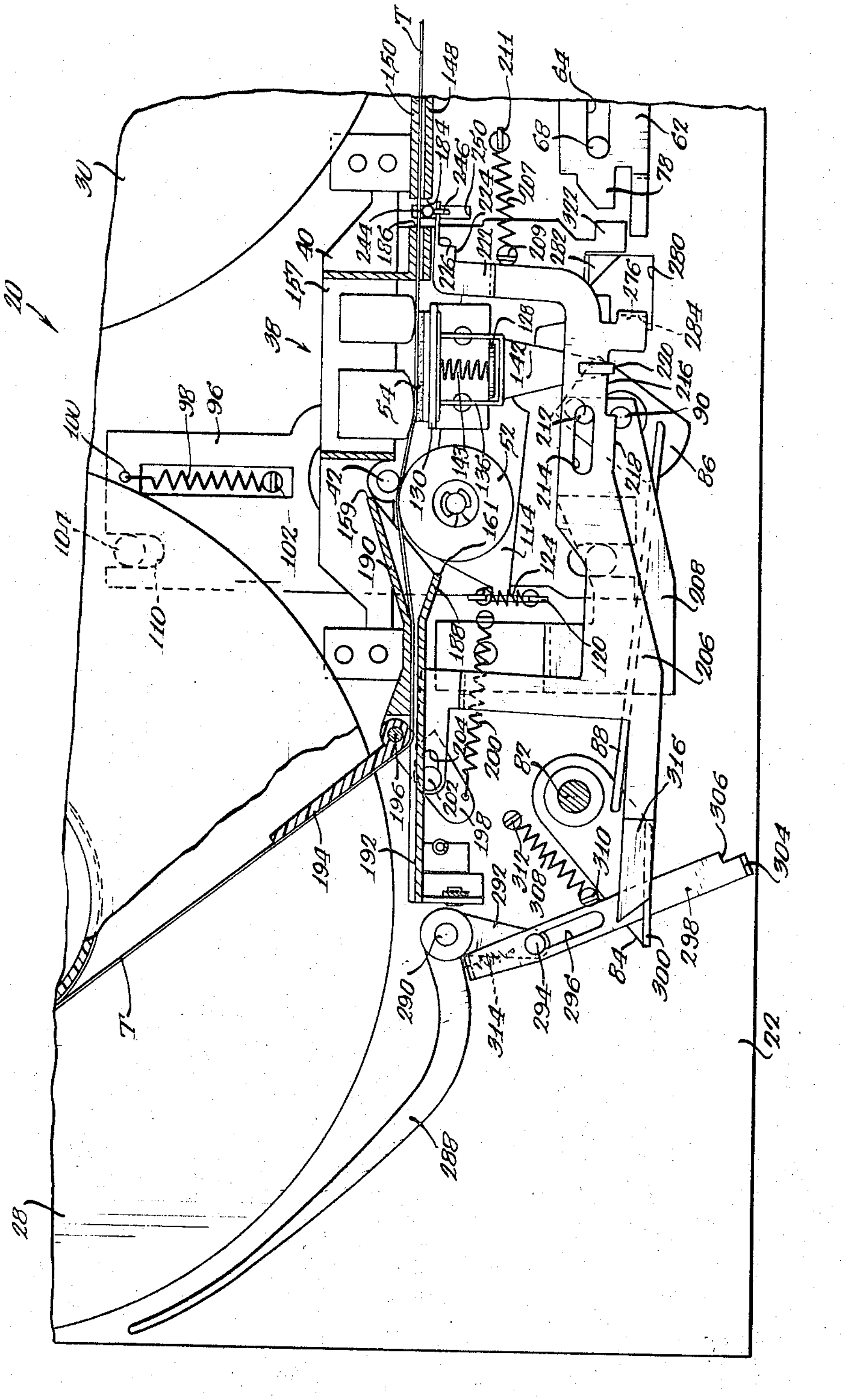
FIG. 4 is an enlarged fragmentary plan view, similar to FIG. 3, but illustrating the tape being gripped by the take-up reel.
Figure 6:
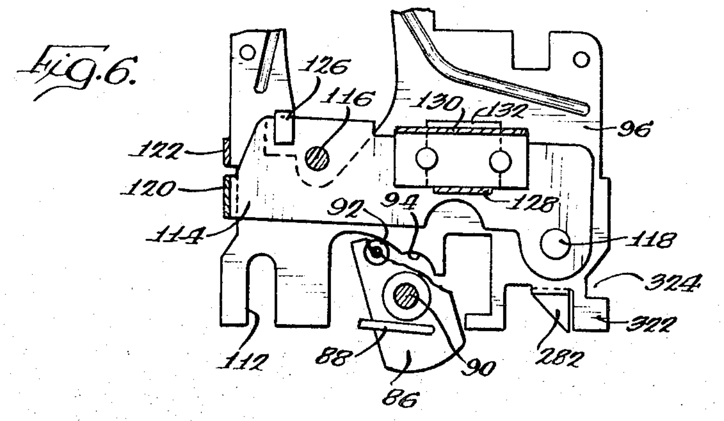
FIG. 6 is a sectional view, taken generally along line 6—6 of FIG. 2.

The presure roller 52 is rotatably mounted on a shaft 116 which extends upwardly from a link 114 that is pivotally mounted on slide 96 at 118 (FIG. 6). A spring 124 extends between an upwardly extending flange 120 on link 114 and an upwardly extending flange 122 on slide 96 to bias link 114 in a clockwise direction, as viewed in FIG. 6. Thus, when slide 96 is moved rearwardly of the tape recorder by clockwise rotation of shaft 82, pressure roller 52 will move into engagement with capstan 42, as can be seen in FIGS. 3 and 4, and link 114 will be pivoted slightly in a counterclockwise direction about pivot 118 to tension spring 124 which holds the pressure roller 52 in engagement with the capstan 42. A stop (FIG. 6) is provided on slide 96 to limit the clockwise pivoting movement of link 114.

Figure 7:
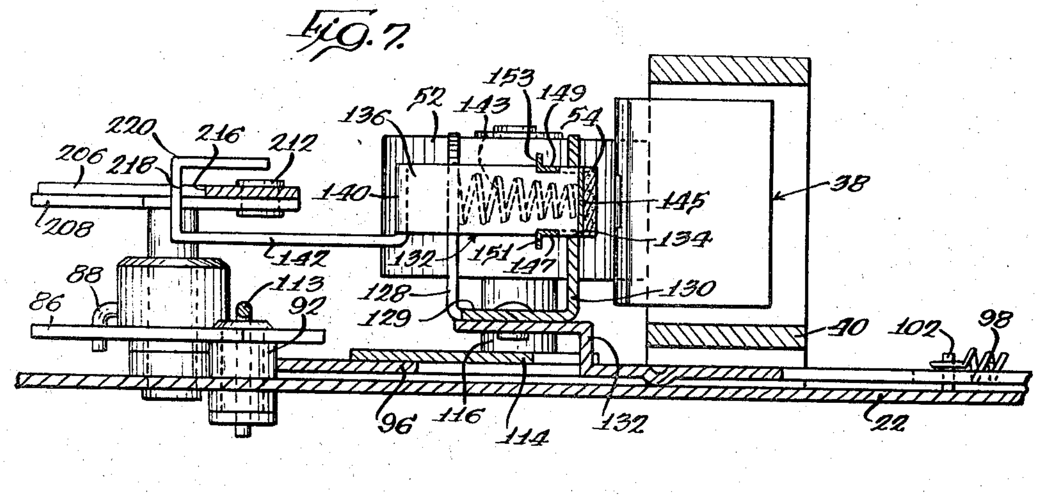
FIG. 7 is an enlarged sectional view, taken generally along line 7—7 of FIG. 3.

As can be best seen in FIG. 7, the backing member 54 is carried by a generally U-shaped bracket having legs 128 and 130, and a central portion 129 which is mounted upon an upwardly struck portion 132 of the secondary slide 96. Backing member 54 is mounted on a carrier assembly 132 and is movable toward and away from the magnetic head assembly 38 through a suitable opening 134 in the arm 130. Carrier assembly 132 includes a U-shaped member having arms 136 and 138, and a bight portion 140 secured to a bracket 142. Carrier 132 includes a further U-shaped member with a bight portion 145 on which the backing member 54 is affixed, and rearwardly extending legs 147 and 149 having respective outwardly bent flanges 151 and 153. A spring 143 is biased between leg 128 and bight portion 145 to urge the backing member 54 outwardly toward the magnetic head assembly 38. Detent means to be hereafter described retain the backing member 54 out of engagement with the magnetic head assembly 38 until the tape has been firmly gripped by the take-up reel 28, and it will be understood that flanges 151 and 153 limit the rearward movement of the carrier 132 toward the head assembly.

Means are provided for guiding the tape T from the supply reel along a tape path including the magnetic head assembly 38, the capstan 42, and pressure roller 52, onto the take-up reel 28. This means comprises a rectangular channel 144 including a bottom wall 146, a front wall 148, and a rear wall 150. Channel 144 is sized so that the tape T may pass therealong without binding. As may be best seen in FIG. 1, means may be provided to define an enlarged inlet opening to channel 144, such as a flared flange 154, to assist in inserting the leading end of the tape T into the channel. Once the tape is inserted in channel 144, and the shaft 82 is pivoted in a clockwise direction to free brake 32, the feeding of the tape from the supply reel 30 to the take-up reel 28 will be completely automatic. The channel rear wall 150 is provided with suitable openings 157 and 159 for receiving the magnetic head assembly 38 and capstan 42 respectively, and the channel front wall 148 includes an enlarged opening 161 for reception of the pressure roller 52 and backing member 54.

The means for initially feeding the tape along the channel 144 includes a wheel 156, formed of resilient material, which projects into the channel 144 adjacent the inlet end thereof through an opening 158 in the front channel wall 148. Wheel 156 is carried by a rotatable shaft 160 and a pulley 162 is provided on the lower end of shaft 160. A belt 164 is trained over pulley 162, and drives the same through a pulley 166 formed on the lower portion of capstan flywheel 50. The pulley ratio between the motor drive pulley (not shown) and the pulley 48 on the flywheel 50, and the pulley 166 and pulley 162 is preferable (but not necessarily) equal, so that the tape will be fed uniformly through the channel 144 without tension or drag when the feeding of the tape is taken over by the capstan 42 and pressure roller 52. Shaft 160 is carried by one end of a first link 168, which is pivotally secured to one end 170 of a second link 172. The other end of link 172 is pivotally secured to the base 22 at 174, and shaft 160 is free to move relative to the base 22 in the opening 176 in the base. A spring 178 is connected between a tab on link 168 and a tab on the base 22 to urge the shaft 160 and the wheel 156 away from the channel 144. A solenoid 180 is mounted on the base 22 for moving the wheel 156 into engagement with a rotatable member 181 extending through the rear wall 150 of the channel 144, when the solenoid 180 is energized, and to this end, the outer end of the solenoid plunger is secured to a tab 182 on the left-hand end of link 168. Thus, when the solenoid 180 is energized, wheel 156 will be moved into engagement with the tape which has been previously inserted in the inlet end of the channel 144, and the solenoid 180 will hold the wheel 156 in driving engagement with the tape, as long as it is energized. The rotatable backing member 181 minimizes the drag on the wheel 156 as it feeds the tape into the channel. Means to be hereafter described are provided for deenergizing the solenoid 180 when the tape has been firmly gripped by the takeup reel 28, and when the solenoid 180 is deenergized, spring 178 pulls the wheel 156 out of the channel 144.

As the tape is fed along the channel 144 by drive wheel 156, the leading end of the tape will first pass by openings 184 and 186 in the front and rear walls 148 and 150 of the channel 144, respectively. Openings 184 and 186 are part of an end of the tape sensing means to be hereafter described. As the tape is fed progressively along the tape path, it then passes by the magnetic head assembly 38, and to the drive capstan 42 and pressure roller 52, which then grip the end of the tape therebetween and drive it in conjunction with the drive wheel 156. As can be best seen in FIGS. 3 and 4, the front wall and rear wall of channel 148 include outwardly diverging portions 188 and 190, respectively, to provide a relatively wide channel portion for receiving the leading end of the tape after it is fed through the drive capstan 42 and pressure roller 52. The tape is then fed to the outlet end of the channel 144 which is disposed generally tangentially to the periphery of the take-up reel 28.

The rear wall 150 of the tape channel 144 includes a discontinuous portion 192 adjacent the outlet end thereof, and a tape sensing finger 194 is pivotally mounted in portion 192 by a pivot pin 196. Finger 194 is movable from the position shown in FIG. 3 to the pivoted position shown in FIG. 4 by the tension in the tape T when the tape is gripped by the takeup reel 28. An arm 198 extends forwardly from finger 194 through an appropriate opening in the front wall 148 of the tape channel, and a spring 200 is connected between arm 198 and a tab on the slide 96 to bias the finger 194 in a counterclockwise direction into a position such as that shown in FIG. 3. An upwardly etxending pin 202 is provided on arm 198, and is slidably received in a slot 204 in a main slide 206. Slide 206 is supported for movement generally transversely of the tape recorder by a bracket 208 which is fixed to the base 22 as at 210. A pin 212 extends upwardly from bracket 208 and is slidably received in a slot 214 in the slide 206 to provide guide means for the slide 206. Slide 206 is biased to the right, as viewed in FIGS. 1, 3, 4 and 10, by a spring 207 which is connected between a tab 209 on the slide 206 and a tab 211 on the base 22, and slide 206 is moved to the left against the bias of spring 207 when the tape T is gripped by the take-up reel 28 to pivot finger 194.

The forward edge of slide 206 is provided with a notch 216 that defines a step 218 for the upwardly and rearwardly bent portion 220 of bracket 142. Step 218 provides a detent that prevents the backing member 54 from moving into engagement with the magnetic head assembly 38 until the tape is gripped by the take-up reel, and this condition is sensed by finger 194. Slide 206 also includes a downwardly and rearwardly extending leg 222 which is provided with forwardly facing steps 224 and 226. Steps 224 and 226 provide means for shutting off the tape recorder when an end-of-the-tape situation is sensed.

Figures 8, 9, 10:
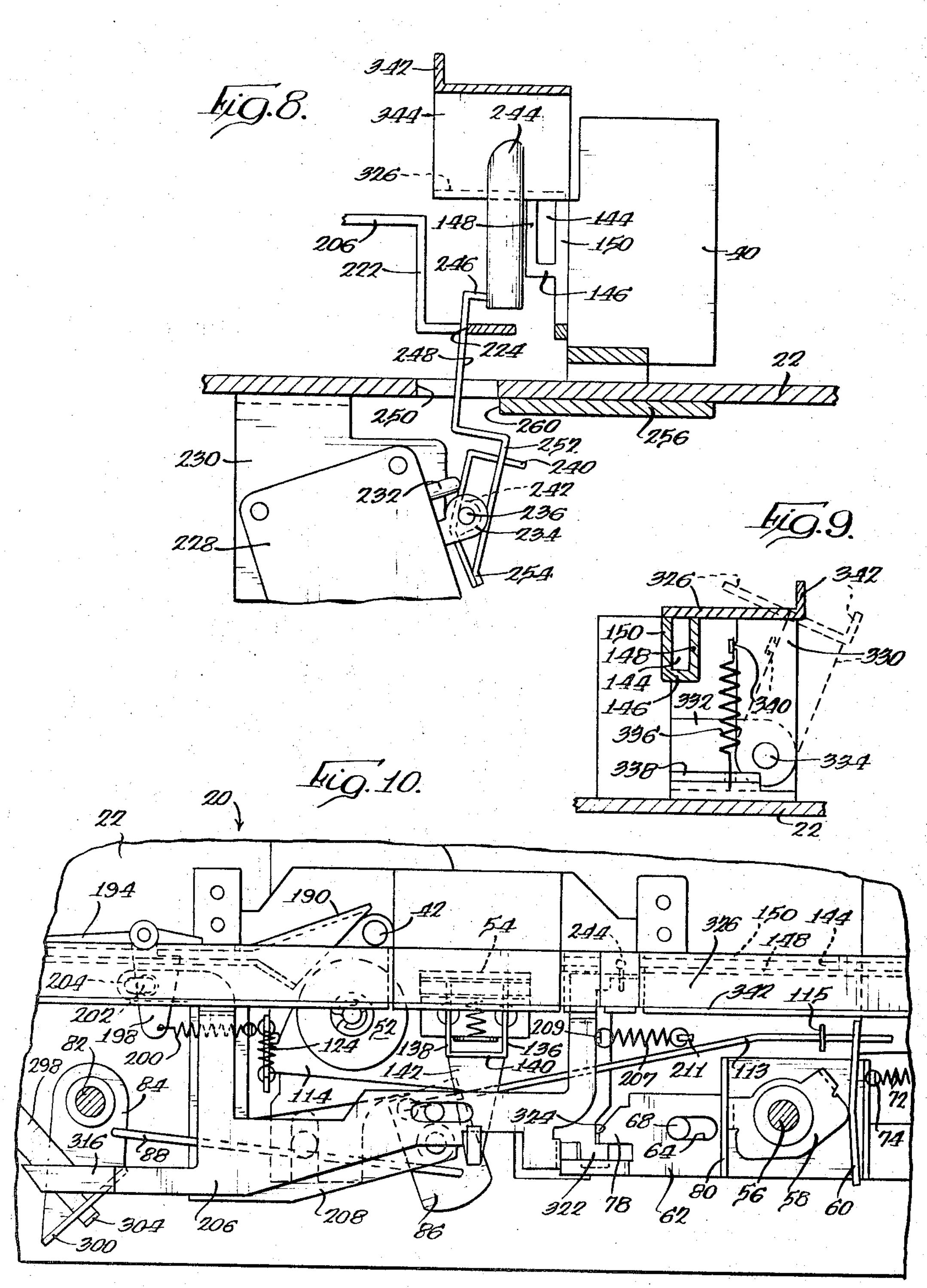
FIG. 8 is an enlarged sectional view, taken generally along line 8—8 of FIG. 3.
FIG. 9 is an enlarged sectional view, taken generally along line 9—9 of FIG. 3.
FIG. 10 is a fragmentary plan view, similar to FIG. 1 and illustrating the means for preventing the initiation of a record or playback cycle during a fast wind or fast rewind cycle.

The means for sensing an end-of-the-tape situation will be best understood from a consideration of FIG. 8, wherein a shut-off switch 228 is shown secured to base 22 by a bracket 230. It will be understood, of course, that the switch 228 is connected in circuit with the drive motor, not shown, and that when the switch actuator 232 moves outwardly, the circuit to the motor is broken. Switch 228 is a conventional item, and actuator 232 is spring biased outwardly, as is well known in the art. A pair of apertured ears 234 extend outwardly from one face of the switch 228, and a pivot pin 236 extends therebetween. A generally L-shaped lever 240 is mounted between ears 234, and is provided with arcuate tabs 242 which are impaled by pin 236 to pivotally mount the lever 240. A tape sensing member 244 is carried by a wire 246 having an offset portion 248 that extends downwardly through an opening 250 in the base 22. The bottom portion 252 of the wire 246 extends through one leg of the lever 240, and the lower end of the wire 246 is secured to the other end of the lever 240 at 254.

A switch shut-off lever 256 is pivotally mounted on base 22 at 258 (FIG. 3) and includes a leading edge 260 which is engageable with the offset portion 248 of the wire 246 to pivot lever 240 about pin 236 into engagement with the actuator 232. Shut-off lever 256 is biased in a clockwise direction toward a switch off position by a spring 262 which is connected between a tab on the base 22 and the lever 256. As can be best seen in FIG. 3, lever 256 includes a tab that extends upwardly through an opening 268 in the base 22 where it is positioned for engagement by an inclined camming surface 270 on the brake actuating bell crank. Thus, when the brake 32 is released as by pivoting the shaft 82 in a clockwise direction, or by pivoting shaft 56 in a clockwise or a counterclockwise direction, camming surface 270 will move out of engagement with tab 264, and spring 262 will pivot the lever 256 into a position such as shown in FIG. 3.

When shaft 82 is pivoted in a clockwise direction into a position such as that shown in FIG. 3, to initiate the automatic feeding of the tape T the leading edge 260 of shut off lever 256 will move out of engagement with the recessed portion 248 of the wire 246, and the switch actuator 232 will bias the lever 240 outwardly. The recessed portion 248 of the wire 244 will engage the step 224 on the slide 206 (FIG. 8), and thus the switch actuator 232 is prevented from moving to a switch "off" position. When the tape has been fed past the openings 184 and 186 in the guide channel 144, and has been firmly gripped on the take-up reel 228, the tension in the tape will pivot the tape sensing finger 194 into a position such as that shown in FIG. 4. The pivotal movement of the finger 194 will move arm 198, and the pin 202 will move the main slide 206 from the position shown in FIG. 3 to the position shown in FIG. 4. This movement of the slide 206 moves the step 224 to the left, from the position shown in FIG. 3, to the position shown in FIG. 4, so that the wire 246 will pivot in a clockwise direction about pin 236, as viewed in FIG. 8, under the urging of the switch actuator 232. However, since tape is present within the channel 144, the switch is prevented from moving to a switch "off" position by the engagement of the tape engaging member 244 with the tape. When the end of the tape passes by the openings 184 and 186 in the tape channel 144, the bias of switch actuator 232 urges lever 240 in a clockwise direction about pin 236, and the weight of the tape engaging member 244 will be offset from the pivot axis of pin 236, so that the lever 240 will be pivoted in a clockwise direction out of engagement with the actuator 232 to interrupt the circuit to the drive motor.

The aforedescribed movement of the slide 206 to the left when the tape sensing finger 194 senses that the tape is gripped by the take-up reel allows the portion 220 of the bracket 142 to move from step 218 to step 216 under the urging of spring 144, and thus the backing member 54 will move rearwardly of the tape recorder and hold the tape against the magnetic head assembly 38 only after the tape has been firmly gripped by the take-up reel 28.

Means are provided for deenergizing solenoid 180 to shift to the feed wheel 156 out of engagement with the tape when the tape is firmly gripped by the take-up reel 28 and includes a switch 272 which is connected in a circuit with the solenoid 180. Switch 272 includes an actuator button 274 which is spring biased outwardly, and which pivots a wire link 276 in a clockwise direction about a pivot 278, as viewed in FIG. 2. Link 276 extends upwardly through an opening 280 in base 22, and link 276 holds switch actuator 274 in a switch closed position to deenergize solenoid 180 by a formed flange 282 on the secondary slide 96 when the tape recorder is in the postion shown in FIG. 1. When shaft 82 is pivoted in a clockwise direction to initiate feeding of the tape, the flange 282 on the secondary slide 96 moves rearwardly out of engagement with link 276, and link 276 pivots in a clockwise direction about pivot 278 into a position shown in FIG. 3 to energize the solenoid 180 and move drive wheel 156 into engagement with the tape. When the tape is firmly gripped on the take-up reel 28 to pivot the tape sensing finger 194 and pull the main slide 206 to the left, a downwardly extending flange 284 on the slide 206 engages the link 276 to pivot the same in a counterclockwise direction about pivot 278 to retract switch actuator 274 and deenergize solenoid 180. When solenoid 180 is deenergized, spring 178 retracts the drive wheel 156 out of the tape channel 144.

Figure 5:
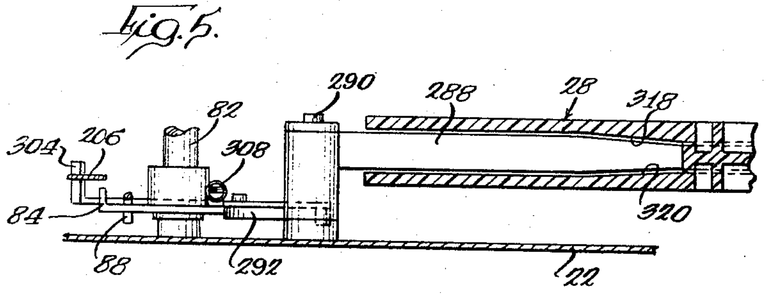
FIG. 5 is a sectional view, taken generally along line 5—5 of FIG. 3.

Means are provided for guiding the tape from the outlet end of the channel 144 into the gripping means of the take-up reel 28. This means includes a guide finger 288 normally disposed tangentially of the take-up reel 28 (FIG. 1) in an out of the way position, pivotally mounted at 290 on base 22 for movement into a tape guiding position. An arm 292 extends forwardly from finger 288, and a pin 294 on arm 292 is slidably received in a slot 296 of a link 298. Arm 84 is provided with an upstanding flange 300 at the forward end thereof, and the outer end of link 298 extends through an opening 302 in flange 300. The forward end of link 298 is provided with an upstanding flange 304, and a notch is provided in the forward end of link 298 to define a detent 306. A spring 308 is connected between a tab 310 on link 298, and a tab 312 on the base 22 to urge the elements into the position shown in FIG. 1. Thus, when shaft 82 is pivoted in a clockwise direction, the flange 300 on the arm 84 will engage the detent 306 on link 298 to pivot the elements into a position shown in FIG. 3. In this position, it will be noted that the finger 288 has been pivoted into a position adjacent the hub of reel 28 by the engagement of the periphery of slot 296 with the pin 294 on arm 292. A spring 314 connects the rearward end of link 298 and arm 292 to resiliently mount finger 288 relative to the link 298. When the assembly has been moved into the position shown in FIG. 3, it will be noted that the upstanding flange 304 on link 298 has been moved into alignment with an outwardly extending arm 316 on main slide 206. Thus, when the tape T is firmly gripped by the take-up reel 28 to pivot the tape sensing finger 194, the movement of the main slide 206 to the left will move arm 316 into engagement with flange 304 to pivot link 298 into the position shown in FIG. 4. The engagement of arm 316 with flange 304 frees the detent 306 from the flange 300, and springs 308 and 314 cooperate to pivot the link 298 into the position shown in FIG. 4, wherein the finger 288 is disposed in the out of the way position spaced from the reel 28. When the finger 288 is in the position shown in FIG. 3, it will be readily apparent that tape passing out of the tape channel 144 will engage the adjacent surface of the finger 288, and will be deflected from its path of travel generally tangentially to the reel 28, and will assume a path of travel generally radially inwardly to the hub of the reel 28. As can be best seen in FIG. 5, reel 28 includes tape gripping means adjacent the hub thereof, and in the illustrated embodiment, the tape gripping means includes a pair of converging surfaces 318 and 320. The tape gripping reel 28 is more fully described in U.S. Patent 3,295,783. It will be readily apparent that other reels having tape gripping means, and well known to those skilled in the art will be satisfactory for the purposes of the present invention. It will also be apparent that certain features of the invention, such as, the tape guiding finger, the tape tension sensing means, and the various means responsive to the winding of the tape upon the take-up reel have patentable significance independently of the use of a special tape gripping reel on the tape recorder.

From the foregoing, it will be apparent that the tape guiding finger 288 will be positioned alongside of the take-up reel 28 during all times except when tape is being fed into the take-up reel. This is a desirable feature in that it eliminates any contact and consequent rubbing noises that would occur if the finger 288 were left in the reel 28 during a record or playback cycle.

When a record or playback cycle has been selected and shaft 82 is rotated in a clockwise direction, the rearward movement of the secondary slide 96 effected by the movement of pin 92 into notch 94 moves a tab 322 on the right front corner of the secondary slide 96 into alignment with the abutment 78 on lever 62. Thus, when tape is being fed to the take-up reel 28, or being played, it is impossible to rotate the shaft 56 and select a fast wind or fast rewind cycle. A notch 324 is provided in secondary slide 96 immediately behind tab 322, so that when the shaft 82 has not been rotated in a clockwise direction, lever 62 is free to move to the left so that a fast wind or fast rewind cycle can be selected. When a fast wind or rewind cycle has been selected, as is shown in FIG. 10, the extension 78 on the lever 62 is positioned in the notch 324 in secondary slide 96, and it is impossible to rotate shaft 82 since the tab 322 on the secondary slide 96 will engage the extension 78 on the lever 62 to prevent rearward movement of the secondary slide 96.

It is often desired to remove the take-up reel 28 and supply reel 30 from the tape recorder after a certain amount of tape has been wound upon the take-up reel 28. Since it is also desirable to provide a cover for the tape channel 144, to prevent foreign matter from accumulating within the channel, the present invention provides a cover 326 for the channel 144 which is pivotally mounted so that it can be moved to an out-of-the-way position wherein the tape extending through the channel 144 can be removed. Accordingly, the cover 326 is provided with downwardly extending arms 330 at opposite ends thereof, which are pivotally secured at 334 to brackets 328 and 332 that are suitably secured to the base 22. Springs 336 are connected between flanges 338 on brackets 320, 328 and 332, and tabs 340 on arms 330 to urge the cover 326 into the full line, covering position shown in FIG. 9. It will be readily appreciated that by applying pressure to the forward upstanding flange 342 on the cover 326, the cover may be pivoted from the full line covering position shown in FIG. 9 to the broken line position, so that the tape can be easily removed from the channel 144. As is clear from FIG. 8, the tape channel cover includes generally vertical portions 344 to provide enlarged cover sections for clearing the magnetic head assembly 38 and the capstan and pressure roller.

We claim:

1. A tape recorder comprising: a base; a supply reel and a take-up reel rotatably mounted on said base; a generally rectangular fixed tape guiding and threading channel extending from said supply reel to said take-up reel and having front and rear walls and a bottom wall to movably guide a tape passing therethrough, said guiding channel and reels lying in a common plane to permit travel of tape without distortion thereof, a plurality of openings in said channel walls intermediate the ends thereof; a magnetic head assembly positioned in one of said openings; a capstan and idler roller assembly movable relative thereto disposed in a pair of said openings intermediate the ends of said channel whereby said channel passes the tape directly past said assemblies; said last mentioned assembly being in engagement during threading; tape threading feed means at the entry end of said channel including a pair of rollers directly engaging opposite sides of the tape with one roller driven to move the tape positively along the channel; a movable threading guide finger at the exit end of the channel and extending between the take-up reel flanges to guide the tape onto the take-up reel; means for sensing the winding of tape on said take-up reel to shift the tape recorder to play operation; and linkage means responsive to said sensing means for moving said guide finger to a removed position out of contact with tape on the take-up reel and for moving one roller of the feed means away from the other to discontinue operation of said threading feed means.

2. A tape recorder as defined in claim 1 wherein a backing member is positioned in a channel opening opposite said magnetic head assembly; means for sensing the end of the tape; said linkage means causing movement of said backing member and said end of tape sensing means to operative positions when tape is wound on the take-up reel.

References Cited

UNITED STATES PATENTS

| | | | |
|---|---|---|---|
| 3,050,225 | 8/1962 | Ulman | 179—100.2 |
| 3,254,856 | 6/1966 | Camras | 242—55.13 |
| 3,254,857 | 6/1966 | Camras | 242—55.13 |

BERNARD KONICK, *Primary Examiner*

J. R. GOUDEAU, *Assistant Examiner.*

U.S. Cl. X.R.

179—100.2